Aug. 30, 1938.   A. MACHOTKA   2,128,466
DETACHABLE HANDLE FOR PAPER DRINKING CUPS
Filed March 11, 1937

Adolf Machotka
INVENTOR

Patented Aug. 30, 1938

2,128,466

UNITED STATES PATENT OFFICE 2,128,466

DETACHABLE HANDLE FOR PAPER DRINKING CUPS

Adolf Machotka, Uvalde, Tex.

Application March 11, 1937, Serial No. 130,360

4 Claims. (Cl. 294—33)

My invention relates to detachable handles for use on paper drinking cups and other containers to which such handles are applicable.

The objects of the invention are: first, to provide a convenient handle, by which such cups may be held; second, to provide a handle which may be attached or detached, at will; third, to provide a handle which may be re-used; fourth, to provide a means of overcoming the discomfort of holding such cups when they contain hot or cold liquids.

I attain these objects by the methods illustrated in the drawing, in which—

Similar numerals refer to similar parts in all the figures.

Figure 1:
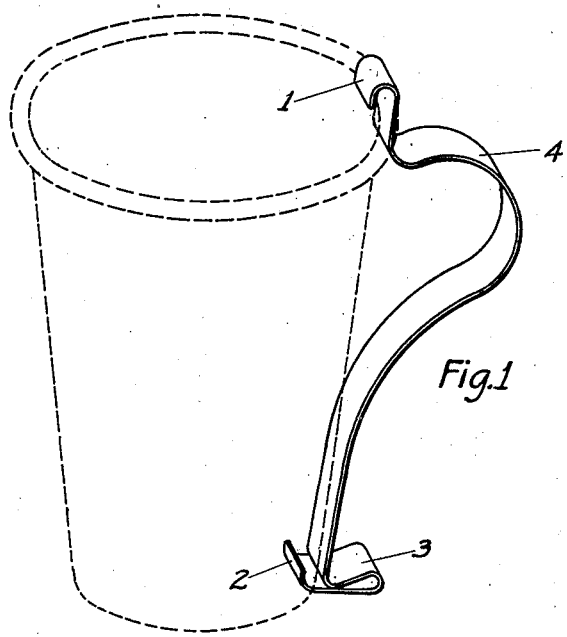
Fig. 1 is a perspective view of the preferred embodiment of my invention. In this figure, the position which the cup would occupy is shown in broken outline.
Figure 3:
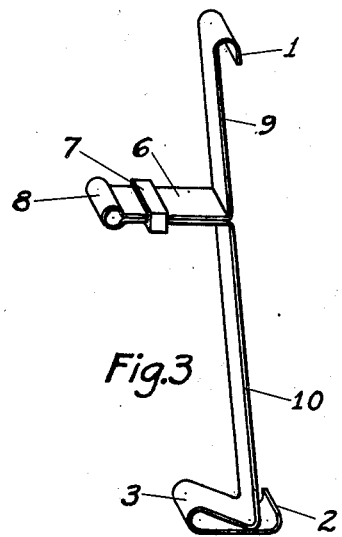
Fig. 3 is a perspective view of a further modification of the handle.
Figure 2:
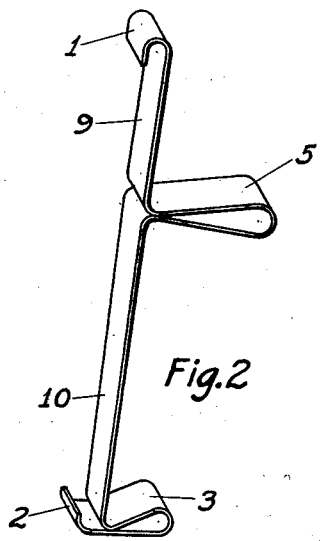
Fig. 2 is a perspective view of a modified form of the handle.

In each of these figures, the numeral 1 designates the upper hook. The numeral 2 designates the lower hook. The numeral 3 designates the base. This base stabilizes the cup against overturning and adds greatly to the convenience of attaching and detaching handle. The member by which the cup is held in the hand is designated by the numeral 4 in Fig. 1, by 5 in Fig. 2 and by 6 in Fig. 3. A slidable band 7, on member 6, serves to lock handle of Fig. 3 to cup. Enlarged end 8, of member 6, prevents band 7 from coming off. In Figs. 2 and 3 the upper upright members are designated by the numeral 9 and the lower upright members by the numerical 10.

The essential parts of the handle are a body portion with hooks at the upper and lower extremities and a base at the lower extremity. The body of the handle shown in Fig. 1 includes the handle proper 4, and parts extending upwardly and downwardly therefrom. The upwardly extending part bears hook 1 and its upper end, while the downwardly extending part bears hook 2 and base 3 at its lower end. The bodies of the handles shown in Figs. 2 and 3 include the control handles 5 and 6, respectively, and upwardly extending part 9 and downwardly extending part 10. Part 9 bears hook 1 at its upper end, while part 10 bears hook 2 and base 3 at its lower end.

A simple method of manufacturing these handles is to form them from strips of material of proper length, width and thickness and possessing the desired qualities. Resilient metal is well suited for this purpose. These strips are formed into any desired shape such as shown in Figs. 1, 2 and 3. The upper part of the material from which the handles are made extends upwardly, along outside of cup, is bent forward, over top rim of cup, then downward, to form the upper hook. The lower part of the material from which the handles are made extends downwardly, along outside of cup, is bent outwardly, then inwardly to form the base, passing under the bottom rim of cup, then bent upwardly to form the lower hook. The essential parts of the handle in Fig. 3 are the same as in Figs. 1 and 2. The control handle in Fig. 3 has a slidable band and a stop means at the outer extremity which prevents band from coming off. This band serves to lock handle to cup when positioned at the end of control handle adjacent the upwardly and downwardly extending members.

An understanding of the novelty, utility and convenience of handles made under this invention may be had from a description of the method of attaching them to, and detaching them from cups. Consider band 7 near outer end, 8, of member 6. The handles in Figs. 1, 2 and 3 may now be attached as follows: Grasp handle by base 3; place upper hook, 1, over upper rim of cup; pull downward on base 3 until lower hook, 2, will pass under lower rim of cup; release base 3, allowing lower hook, 2, to engage lower rim of cup. The handles are of such height that the tension in them holds them securely to the cups to which they are attached. To lock the handle of Fig. 3 to cup, slide band 7 inwardly toward uprights 9 and 10.

In removing handles, consider band 7 near outer end, 8, of member 6. The handles of Figs. 1, 2 and 3 may now be removed as follows: Grasp handle by base 3, pulling downward and outward until lower hook, 2, is released from bottom rim of cup; then raise handle upward to disengage upper hook, 1, from upper rim of cup.

I am aware that detachable handles, for various purposes, have been invented in the past. My invention is intended primarily and specifically to meet the requirements of service in connection with paper drinking cups and other containers which impose similar requirements. Foremost among these requirements are: low cost; minimum weight; stability against overturning of cup; greatest convenience of attachment and detachment; and, logical, attractive appearance. The full strength of the material from which the handles are made is retained throughout, for it is not sheared, cut, perforated or otherwise weakened. It is this novel and simple method of construction which makes these handles practical for paper drinking cups.

While I have herein set forth a certain preferred embodiment of my invention, it is understood that I may vary from the same in minor structural details, so as best to construct a practical device for the purpose intended, not departing from the spirit of the invention, and within the scope of the appended claims.

For use in connection with paper drinking cups and other containers,

I claim:

1. A detachable handle for a cup including a longitudinally expansible and contractible body portion, hooks located at the upper and lower extremities of the body portion adapted to detachably engage the upper and lower rims of the cup when the handle is in contracted condition and a base on said body portion extending radially outward from the lower rim of the cup having its bottom substantially in the plane of the said lower rim.

2. A detachable handle for a cup, including a longitudinally expansible and contractible body portion, said body portion comprising a loop adapted for the insertion of a finger or fingers and members extending upwardly and downwardly therefrom, a hook at the upper extremity of said upwardly extending member and a hook at the lower extremity of said downwardly extending member, said hooks being adapted to detachably engage the upper and lower rims of the cup when the handle is in contracted condition and a base on lower part of said downwardly extending member extending radially outward from the lower rim of the cup, said base having its bottom substantially in the plane of said lower rim.

3. A detachable handle for a cup, including a longitudinally expansible and contractible body portion, said body portion comprising a control handle adapted to be held between the thumb and fingers and parts extending upwardly and downwardly therefrom, a hook at the upper extremity of said upwardly extending part and a hook at the lower extremity of said downwardly extending part, said hooks being adapted to detachably engage the upper and lower rims of the cup when the handle is in contracted condition and a base on lower part of said downwardly extending part extending radially outward from the lower rim of the cup, said base having its bottom substantially in the plane of the said lower rim.

4. A detachable handle for a cup, including a longitudinally expansible and contractible body portion, said body portion comprising a control handle and members extending upwardly and downwardly therefrom, a band slidable longitudinally on said control handle adapted to lock handle to cup when positioned on inner end of said control handle, a stop means at the outer extremity of said control handle limiting the travel of said band on said control handle, a hook at the upper extremity of said upwardly extending member and a hook at the lower extremity of said downwardly extending member, said hooks being adapted to detachably engage the upper and lower rims of the cup when the handle is in contracted condition and a base on lower part of said downwardly extending member extending radially outward from the lower rim of the cup, said base having its bottom substantially in the plane of the said lower rim.

ADOLF MACHOTKA.